(12) United States Patent
Wang

(10) Patent No.: US 12,492,730 B2
(45) Date of Patent: Dec. 9, 2025

(54) DISC BRAKE PISTON RETRACTION TOOL WITH BACKING PLATE EXPANSION STRUCTURE

(71) Applicant: Tian Shoei Wang, Taichung (TW)

(72) Inventor: Tian Shoei Wang, Taichung (TW)

( * ) Notice: Subject to any disclaimer, the term of this patent is extended or adjusted under 35 U.S.C. 154(b) by 241 days.

(21) Appl. No.: 18/162,729

(22) Filed: Feb. 1, 2023

(65) Prior Publication Data

US 2023/0167863 A1  Jun. 1, 2023

(51) Int. Cl.
*F16D 65/00* (2006.01)
*B25B 13/22* (2006.01)
*B25B 27/00* (2006.01)

(52) U.S. Cl.
CPC ...... *F16D 65/0043* (2013.01); *B25B 27/0035* (2013.01); *B25B 13/22* (2013.01)

(58) Field of Classification Search
CPC ... B25B 27/0035; B25B 13/463; B25B 13/12; F16D 65/0043; Y10T 29/53683
See application file for complete search history.

(56) References Cited

U.S. PATENT DOCUMENTS 11,261,926 B1 * 3/2022 Kuzmic ............... B60T 17/221
2019/0076997 A1 * 3/2019 Hernandez, Jr. .... B25B 27/0035

* cited by examiner

*Primary Examiner* — Christopher J. Besler

(57) ABSTRACT

A disc brake piston retraction tool is provided. When the tool is applied to a large-scale disc brake, it is necessary to increase the width in the left-to-right direction of the working surface of a pressure plate of the tool. A plate expansion unit is coupled to the outer surface of the pressure plate. When a locking unit is inserted in a coupling hole of the pressure plate, a steel ball is retracted. After the steel ball passes through the coupling hole, a compression spring rebounds to produce a positioning effect. The backing plate can be easily and quickly mounted to the outer surface of the pressure plate to increase the width of the working surface of the pressure plate. The locking device allows the steel ball to be retracted to exit the coupling hole.

3 Claims, 6 Drawing Sheets

DISC BRAKE PISTON RETRACTION TOOL WITH BACKING PLATE EXPANSION STRUCTURE

FIELD OF THE INVENTION

The invention relates to a disc brake piston retraction tool with a backing plate expansion structure, which can increase the width in the left-to-right direction of the working surface of a pressure plate of the tool. The tool can be applied to a single-cylinder or dual-cylinder piston brake.

BACKGROUND OF THE INVENTION

In general, auto mechanics responsible for repairing disc brakes and replacing brake pads may use various press machine tools. For these press machine tools, one difficulty is the need for professional mechanical use capabilities to achieve the retraction of one or more pistons associated with the caliper housing. Therefore, for brake repair and brake pad replacement, there is a need to operate an easy-to-use tool for retraction of one or more pistons.

There is a conventional art about a disc brake piston retractor tool. The tool is placed in the inner space of the caliper housing. Through the reciprocating operation of the reversible ratchet wrench, the first pressure plate and the second pressure plate are unidirectionally driven to gradually move outwardly toward the extended position. The first pressure plate abuts against the fixed wall of the caliper housing as a support, and the second pressure plate is used to push the protruding piston back to the initial position in the cylinder associated with the caliper housing. In the aforementioned conventional art, the spacer bar of the reversible ratchet wrench assembly is simply pulled back and forth to push the piston back into the cylinder. However, the above-mentioned conventional tool is applied to a single-cylinder piston caliper housing. Due to the matching of the operating space or the restrictive conditions of the piston position of the housing, if it is applied to a large double-cylinder piston caliper housing, it is difficult for the pistons to be retracted synchronously because of the insufficient width of the left and right working surfaces of the first and second pressure plates. Using tools of different specifications may solve this problem. But, this increases the cost to purchase tools.

SUMMARY OF THE INVENTION

The primary object of the invention is to provide a disc brake piston retraction tool with a backing plate expansion structure, comprising a reversible ratchet wrench that can be pulled and operated back and forth for a force output end of the reversible ratchet wrench to be selectively switched so as to drive a pair of pressure plates to expand away from each other or retract toward each other. The pressure plates each have at least two coupling holes. A plate expansion unit is coupled to an outer surface of each of the pressure plates via the coupling holes. The plate expansion unit includes a backing plate. The backing plate has a width in a left-to-right direction greater than that of the corresponding pressure plate. The backing plate has at least two fixing holes corresponding to the coupling holes. A locking device is fixedly connected to each of the two fixing holes. The locking device includes a plug, a compression spring, a steel ball, and a sleeve.

Preferably, the plug includes a plug body. One end of the plug body has a fixing post that is coupled and fixed to a corresponding one of the fixing holes. A surface of the plug body is radially formed with a receiving hole.

Preferably, the compression spring is installed in the receiving hole.

Preferably, the steel ball is in contact with one end of the compression spring and installed in the receiving hole. The steel ball is biased by the compression spring.

Preferably, the sleeve is tightly fitted and fixed on the surface the plug body. The sleeve has a restricting hole that is slightly smaller in diameter than the receiving hole so that part of the steel ball extends out of the restricting hole.

When the tool is applied to a large-scale disc brake, it is necessary to increase the width in the left-to-right direction of the working surface of the pressure plate. The plate expansion unit is coupled to the outer surface of each of the pressure plates. When the locking unit is inserted in the coupling hole, the steel ball is retracted. After the steel ball passes through the coupling hole, the compression spring rebounds to produce a positioning effect. The backing plate can be easily and quickly mounted to the outer surface of the pressure plate to increase the width in the left-to-right direction of the working surface of the pressure plate. The locking device allows the steel ball to be retracted to exit the coupling hole, so that the plate expansion unit can be easily removed from the outer surface of the corresponding pressure plate. The original working mode of the pair of pressure plates can be recovered quickly. The tool provided by the invention can be applied to a single-cylinder or dual-cylinder piston brake.

Preferably, the backing plate has a working surface. One end of the fixing hole, facing the working surface, is formed with a flared conical hole portion. The plug is made of a low-hardness metal material. A nail hole is formed in a center of an end face of the fixing post. The fixing post is placed in the fixing hole. A high-hardness nail is struck into the nail hole by pressing. The end face of the fixing post is enlarged and deformed in the conical hole portion, so that the plug is fixedly connected to the fixing hole. Besides, the nail is flush with the working surface of the backing plate.

Preferably, the receiving hole of the plug is a circular hole passing through the plug body. The sleeve is fitted on the surface of the plug body to restrict the compression spring from exiting the receiving hole. The compression spring is stopped in the receiving hole by the sleeve, so that the steel ball is pushed by the compression spring to protrude from the restricting hole.

DESCRIPTION OF THE PREFERRED EMBODIMENTS

Figure 1:
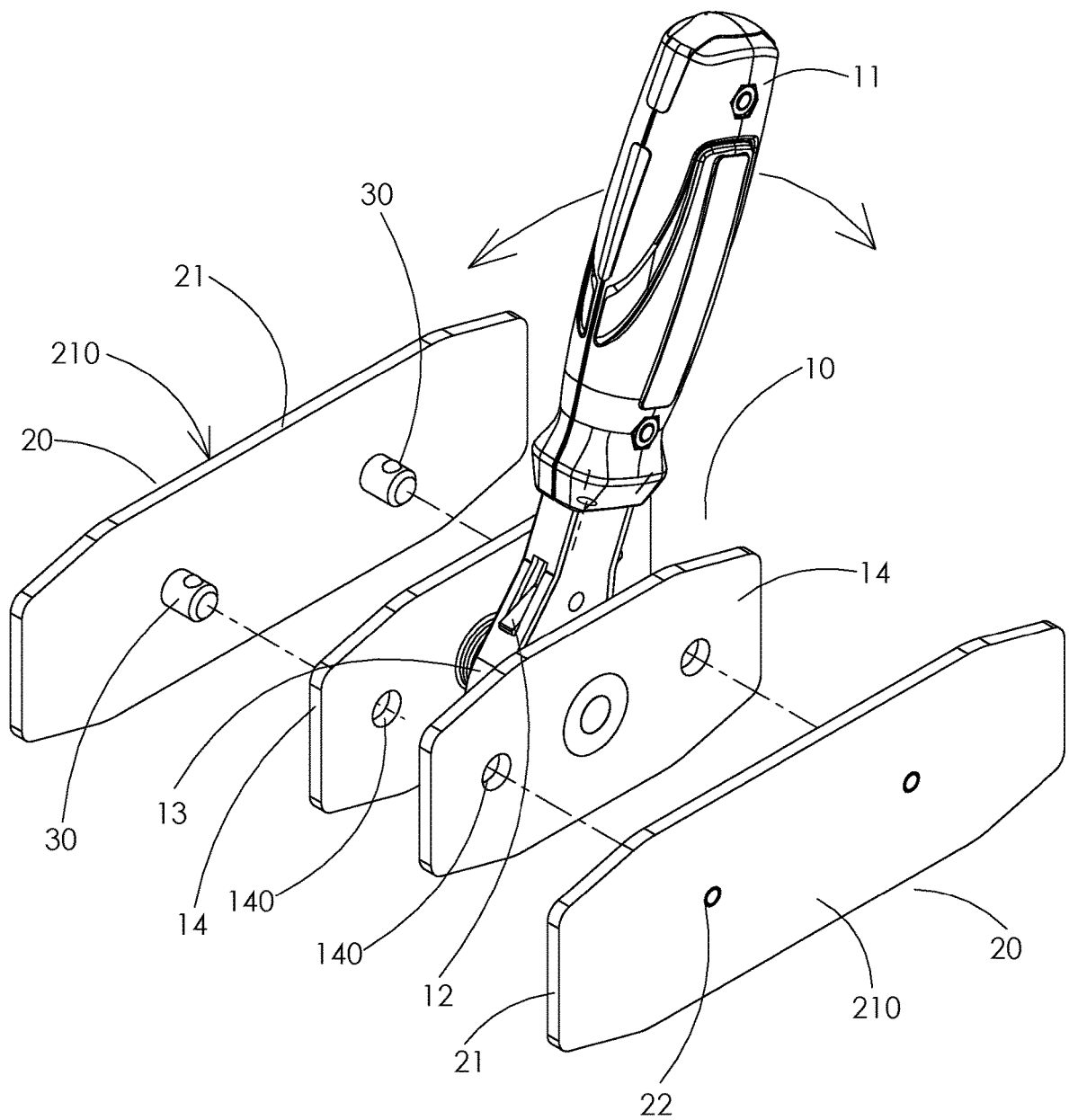
FIG. 1 is a perspective view of the invention before the plate expansion unit is mounted to the pressure plate.

Referring to FIGS. 1 to 7, a disc brake piston retraction tool 10 of the invention is shown and comprises a reversible ratchet wrench 11 that can be pulled and operated back and forth. Through a switching member 12, a force output end 13 of the reversible ratchet wrench 11 is selectively switched to drive a pair of pressure plates 14 to expand away from each other or retract toward each other. The pressure plates 14 of the tool 10 each have at least two coupling holes 140. A plate expansion unit 20 is coupled to the outer surface of each of the pressure plates 14 via the coupling holes 140. The plate expansion unit 20 includes a backing plate 21. The backing plate 21 has a width in a left-to-right direction greater than that of the corresponding pressure plate 14. The backing plate 21 has at least two fixing holes 22 corresponding to the coupling holes 140. A locking device 30 is fixedly connected to each of the two fixing holes 22. The locking device 30 includes a plug 31, a compression spring 32, a steel ball 33, and a sleeve 34.

The plug 31 includes a cylindrical plug body 310. One end of the plug body 310 has a cylindrical fixing post 311 that is coupled and fixed to the corresponding fixing hole 22. The surface of the plug body 310 is radially formed with a receiving hole 312.

The compression spring 32 is installed in the receiving hole 312.

The steel ball 33 is in contact with one end of the compression spring 32 and installed in the receiving hole 312. The steel ball 33 is biased by the compression spring 32.

The sleeve 34 is a cap-shaped sleeve, which is tightly fitted and fixed on the surface of the plug body 310. The sleeve 34 has a circular restricting hole 340 that is slightly smaller in diameter than the receiving hole 312, so that part of the steel ball 33 extends out of the restricting hole 340.

Figure 5:
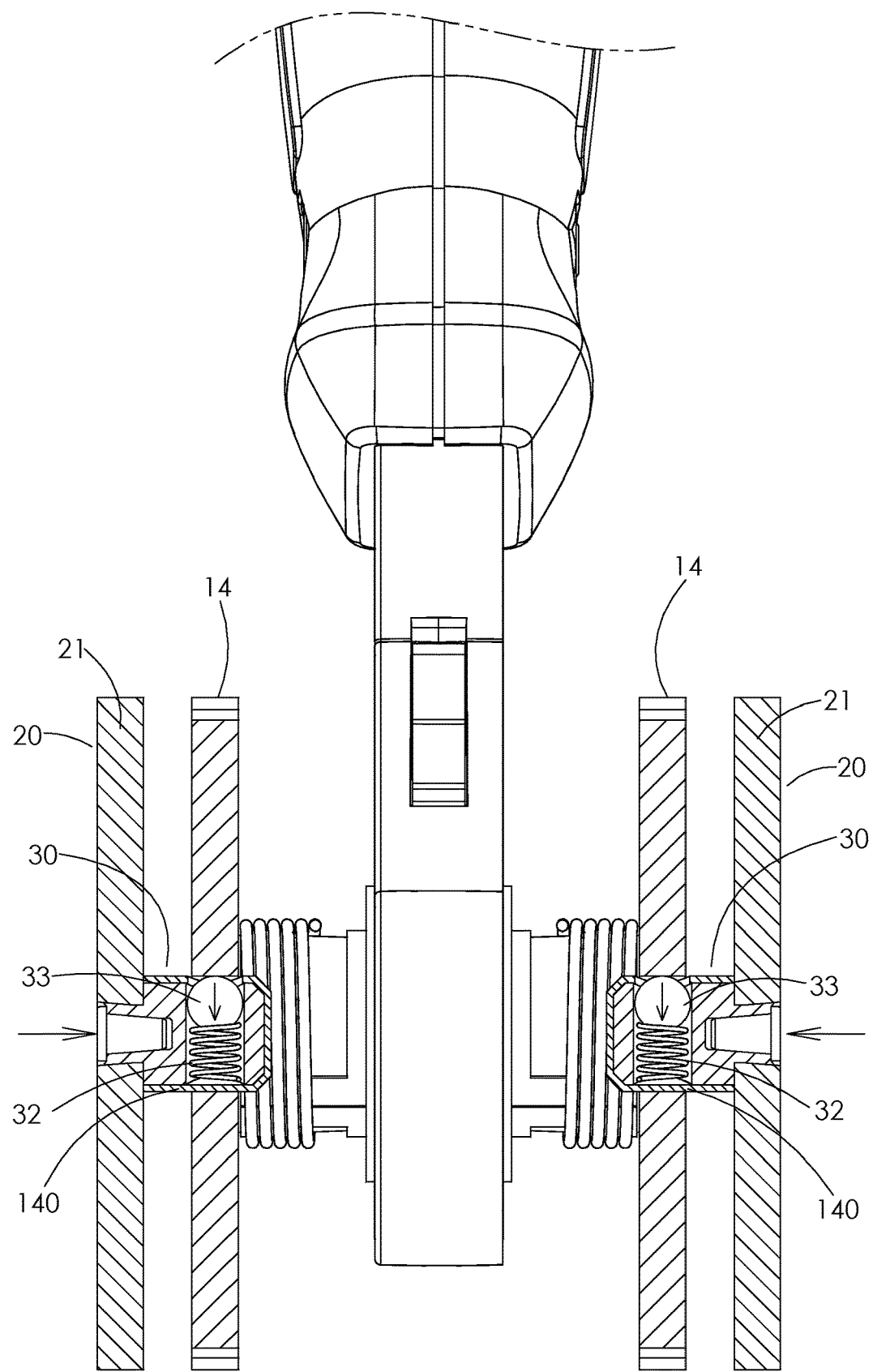
FIG. 5 is a schematic view of the invention, illustrating that the plate expansion unit is to be mounted to the pressure plate.
Figure 6:
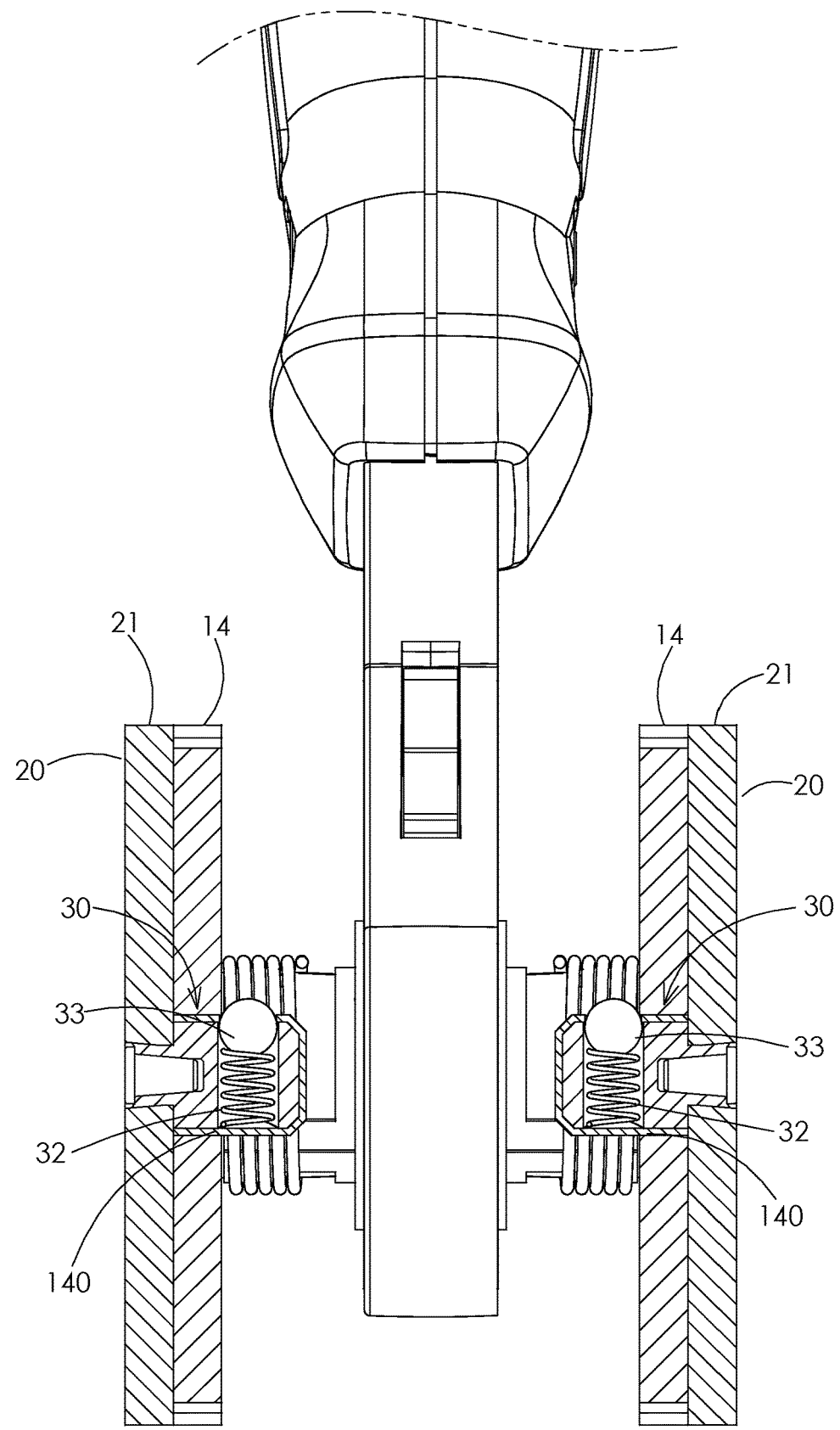
FIG. 6 is a cross-sectional view of the invention, illustrating that the plate expansion unit is mounted to the pressure plate.
Figure 7:
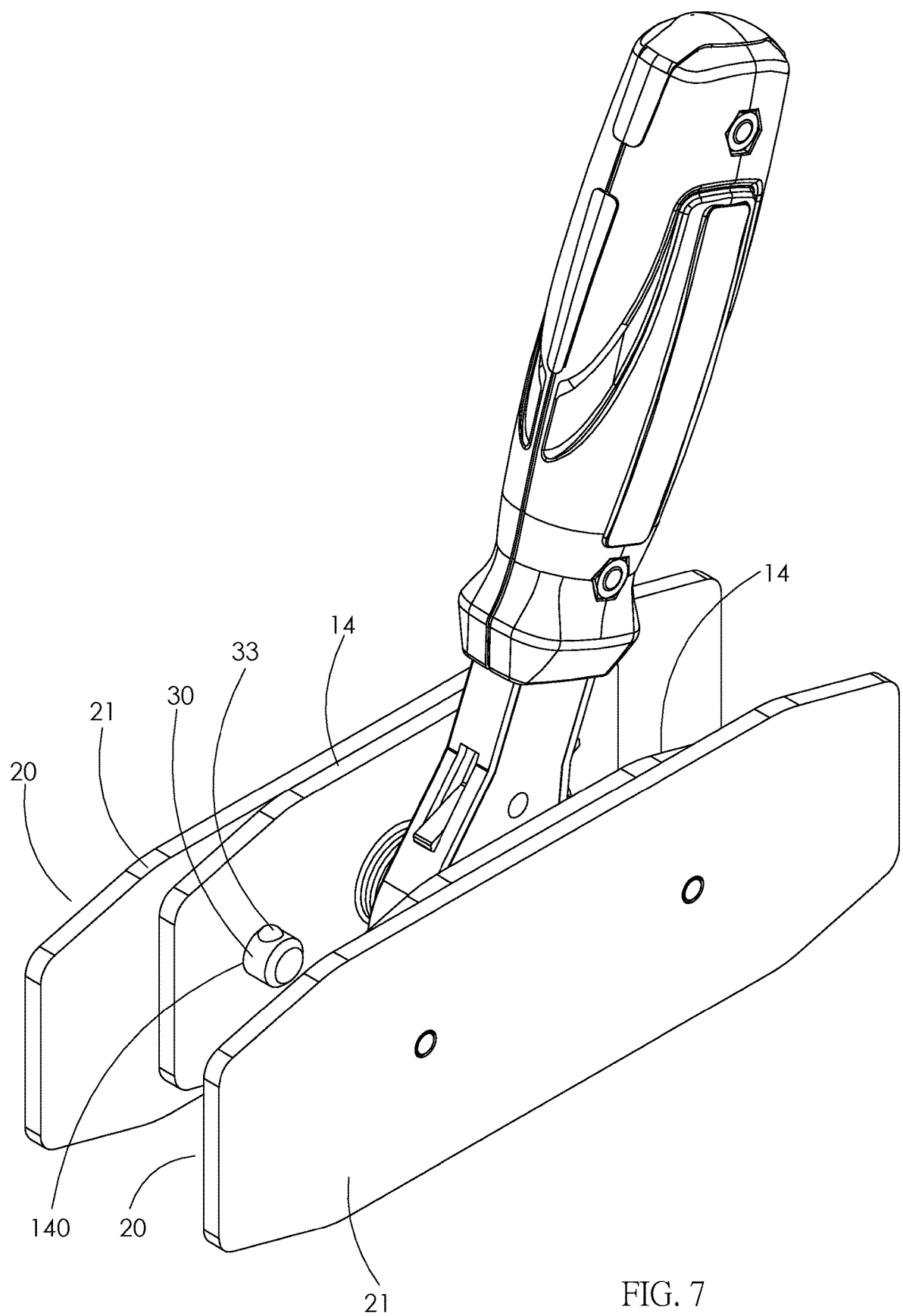
FIG. 7 is a perspective view of the invention after the plate expansion unit is mounted to the pressure plate.

When the tool 10 is applied to a large-scale disc brake (such as a double-cylinder piston brake), it is necessary to increase the width in the left-to-right direction of the working surface of the pressure plate 14. As shown in FIG. 5, FIG. 6 and FIG. 7 specifically, the plate expansion unit 20 is coupled to the outer surface of each of the pressure plates 14. When the locking unit 30 is inserted in the coupling hole 140, the steel ball 33 is retracted (referring to the compression of the compression spring 32). After the steel ball 33 passes through the coupling hole 140, the compression spring 32 rebounds to produce a positioning effect. The backing plate 21 can be easily and quickly mounted to the outer surface of the pressure plate 14 to increase the width in the left-to-right direction of the working surface of the pressure plate 14. The locking device 30 allows the steel ball 33 to be retracted (the compression of the compression spring 32) to exit the coupling hole 140 (equivalent to the reverse action in FIG. 5), so that the plate expansion unit 20 can be easily removed from the outer surface of the corresponding pressure plate 14. As shown in FIG. 1 specifically, the original working mode of the pair of pressure plates 14 can be recovered quickly. The tool provided by the invention can be applied to a single-cylinder or dual-cylinder piston brake.

Figure 2:
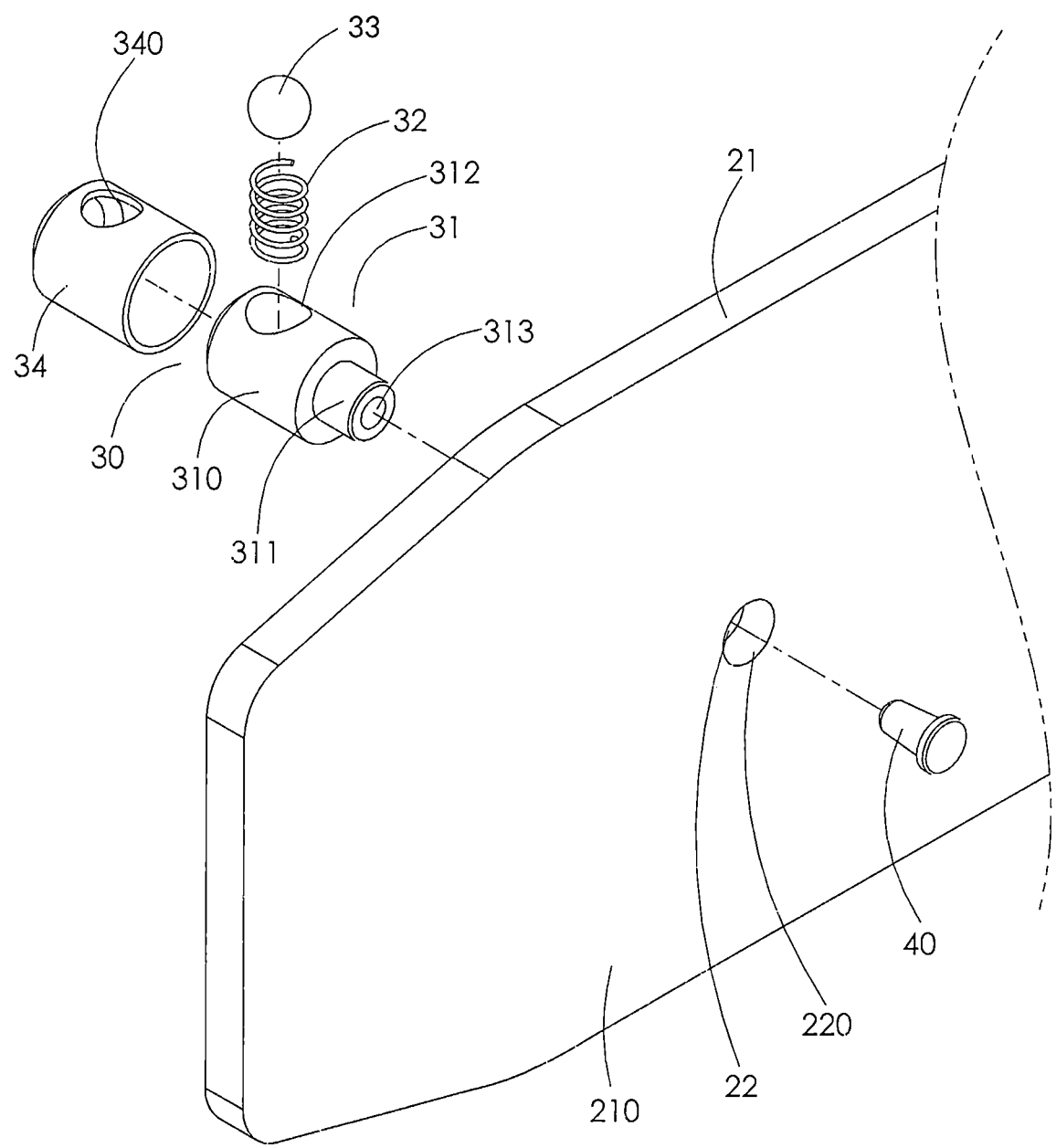
FIG. 2 is an exploded view of the locking device of the invention.
Figure 3:
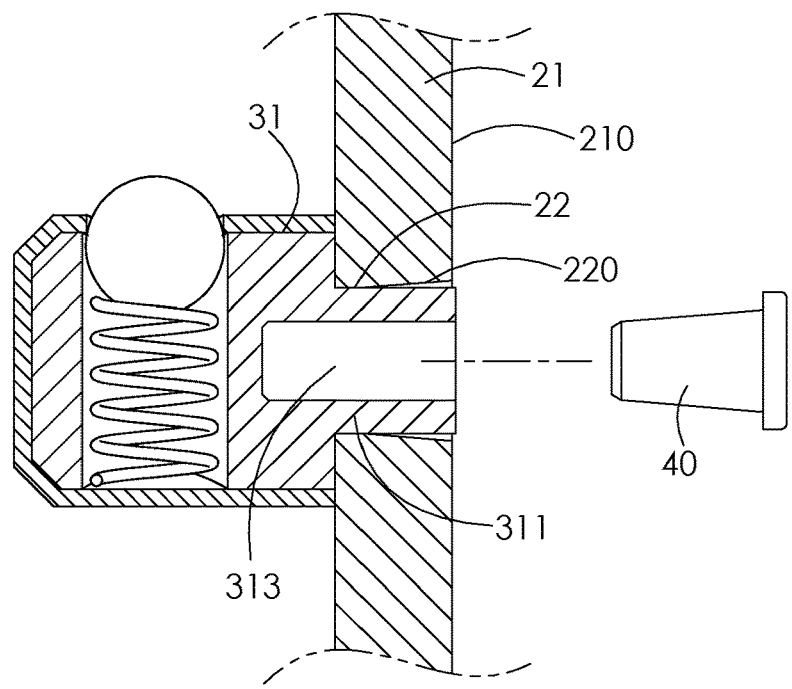
FIG. 3 is a schematic view of the invention, illustrating that the locking device is machined to be coupled to the backing plate.
Figure 4:
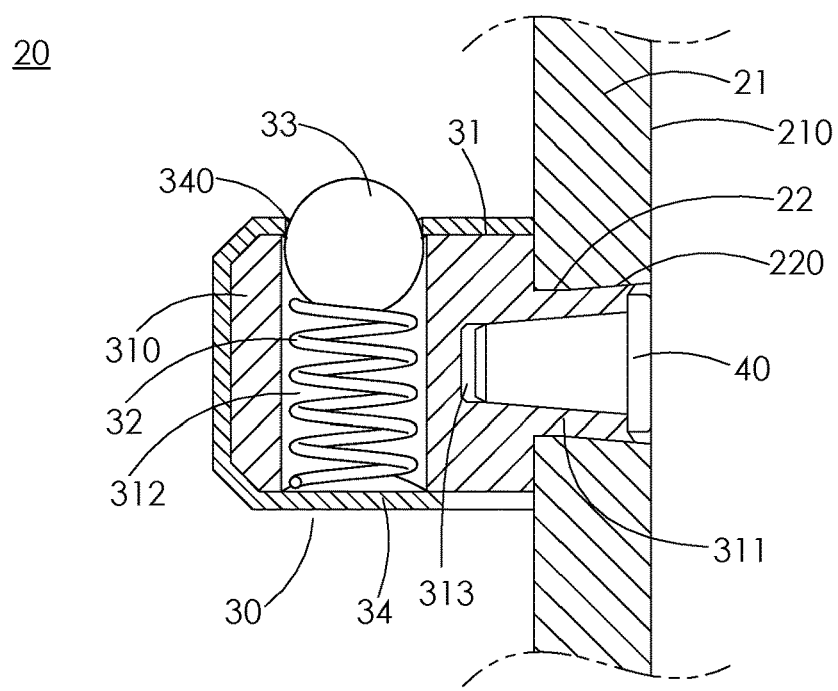
FIG. 4 is a cross-sectional view of the invention, illustrating that the backing plate is coupled to the invention.

According to the above embodiment, as shown in FIG. 2, FIG. 3 and FIG. 4 specifically, the backing plate 21 has a working surface 210. One end of the fixing hole 22, facing the working surface 210, is formed with a flared conical hole portion 220. The plug 31 is made of a low-hardness metal material (such as aluminum, iron). A nail hole 313 is formed in the center of the end face of the fixing post 311. The fixing post 311 is placed in the fixing hole 22, and a high-hardness nail 40 (such as a steel nail) is struck into the nail hole 313 by pressing (using a hydraulic press machine). The end face of the fixing post 311 is enlarged and deformed in the conical hole portion 220, so that the plug 31 is fixedly connected to the fixing hole 22. Besides, the nail 40 is flush with the working surface of the backing plate 21.

According to the above embodiment, as shown in FIG. 2 and FIG. 4 specifically, the receiving hole 312 of the plug 31 is a circular hole passing through the plug body 310. The sleeve 34 is fitted on the surface of the plug body 310 to restrict the compression spring 32 from exiting the receiving hole 312. The compression spring 32 is stopped in the receiving hole 312 by the sleeve 34, so that the steel ball 33 is pushed by the compression spring 32 to protrude from the restricting hole 340.

While the invention has been described in terms of preferred embodiments, those skilled in the art will recognize that the invention can be practiced with modifications within the spirit and scope of the appended claims.

What is claimed is:

1. A disc brake piston retraction tool with a backing plate expansion structure, comprising:
   a reversible ratchet wrench that can be pulled and operated back and forth for a force output end of the reversible ratchet wrench to be selectively switched, so as to drive a pair of pressure plates to expand away from each other or retract toward each other; the pressure plates each having at least two coupling holes;
   a plate expansion unit being coupled to an outer surface of each of the pressure plates via the coupling holes; the plate expansion unit including a pair of backing plates, each of the backing plates having a width in a left-to-right direction greater than that of a corresponding pressure plate of the pair of pressure plates, each of the backing plates further having at least two fixing holes corresponding to the coupling holes of the corresponding pressure plates, a locking device being fixedly connected to each of the at least two fixing holes; the locking device including:
   a plug including a plug body, one end of the plug body having a fixing post that is coupled and fixed to a corresponding one of the fixing holes, a surface of the plug body being radially formed with a receiving hole;
   a compression spring installed in the receiving hole; and
   a steel ball being in contact with one end of the compression spring and installed in the receiving hole, the steel ball being biased by the compression spring; and
   a sleeve being tightly fitted and fixed on the surface of the plug body, the sleeve having a restricting hole that is slightly smaller in diameter than the receiving hole so that part of the steel ball extends out of the restricting hole.

2. The disc brake piston retraction tool of claim 1, wherein the backing plate has a working surface, one end of the fixing hole, facing the working surface, is formed with a flared conical hole portion, the plug is made of a low-hardness metal material, a nail hole is formed in a center of an end face of the fixing post, the fixing post is located in the fixing hole, a high-hardness nail is located in the nail hole by pressing, and the end face of the fixing post is in the conical hole portion.

3. The disc brake piston retraction tool of claim 1, wherein the receiving hole of the plug is a circular hole passing through the plug body, the sleeve is fitted on the surface of the plug body to restrict the compression spring from exiting the receiving hole.

\* \* \* \* \*